Dec. 19, 1950 J. BRIGHT 2,534,411
WIND POWER MACHINE
Filed May 4, 1948 6 Sheets-Sheet 3

INVENTOR.
JOHN BRIGHT,
BY
McMorrow, Berman + Davidson
ATTORNEYS.

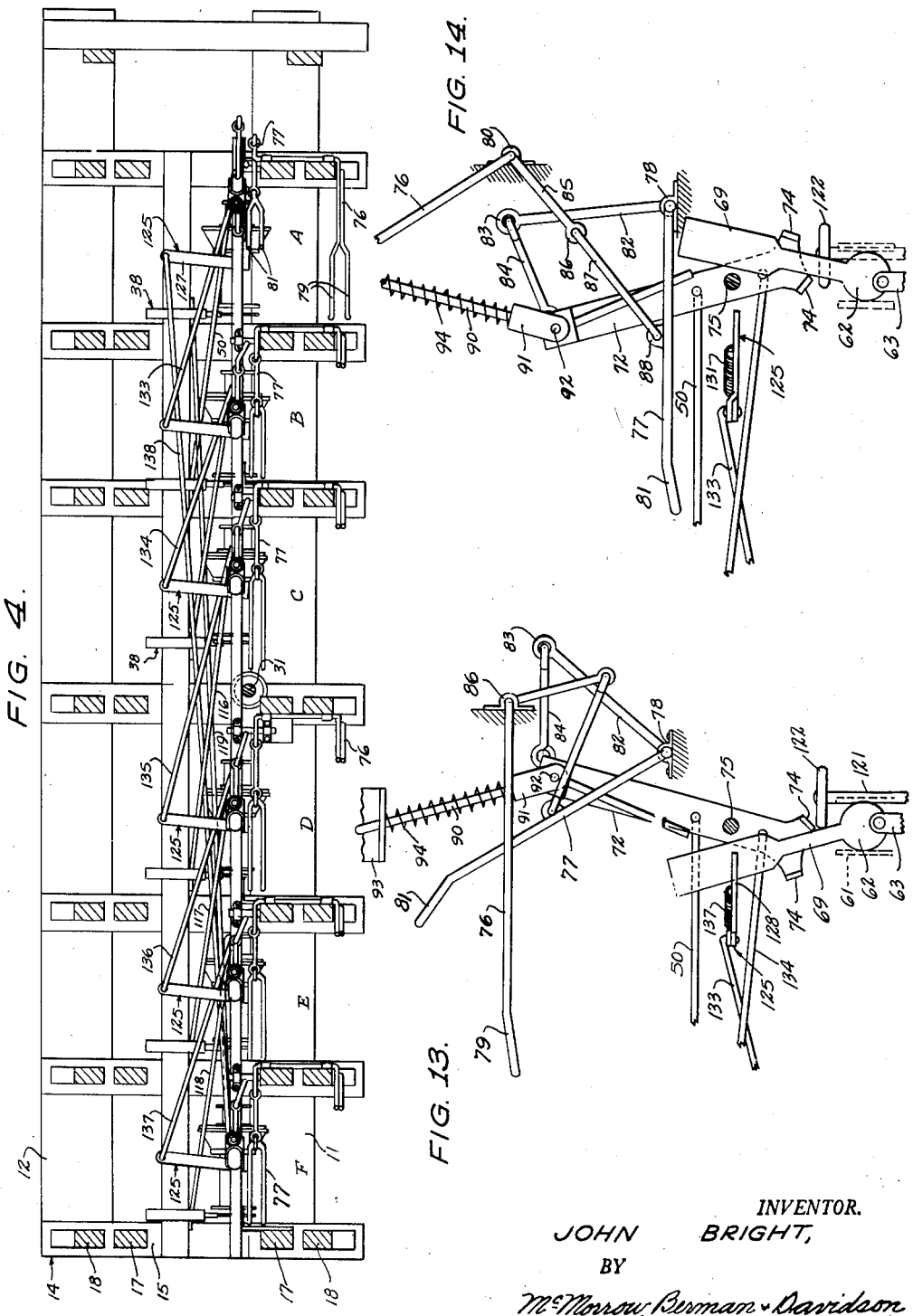

Dec. 19, 1950    J. BRIGHT    2,534,411
WIND POWER MACHINE

Filed May 4, 1943    6 Sheets-Sheet 5

INVENTOR.
JOHN BRIGHT,
BY
McMorrow, Berman & Davidson
ATTORNEYS.

Dec. 19, 1950   J. BRIGHT   2,534,411
WIND POWER MACHINE
Filed May 4, 1943   6 Sheets-Sheet 6

INVENTOR.
JOHN BRIGHT,
BY
McMorrow, Berman & Davidson
ATTORNEYS.

Patented Dec. 19, 1950

2,534,411

UNITED STATES PATENT OFFICE 2,534,411

WIND-POWER MACHINE

John Bright, Oklahoma City, Okla.

Application May 4, 1948, Serial No. 25,058

3 Claims. (Cl. 60—8)

This invention relates to improvements in wind power machines, and more particularly to an improved machine for converting wind energy into mechanical or electrical power and for storing such wind energy and dispensing the mechanical or electrical power over a long period of time at a substantially uniform, predetermined rate.

Various types of windmills have long been in use for converting the energy of wind or air currents into mechanical power for various purposes useful to man, such as pumping water, grinding grain, and generating electrical energy. All of these known devices, however, are of small capacity, the largest producing not more than five to ten mechanical horsepower, and are completely subject to the vagaries of the wind and operate only when the wind velocity is between predetermined lower and upper limits. The power produced by such prior-art devices is thus not only very small, but is also sporadic and not dependable for any use requiring substantially constant and uninterrupted operation.

The present invention contemplates the provision of apparatus capable of producing a large quantity of mechanical or electrical power, a power output of the order of one hundred times the power output of present-day devices of this character being altogether possible, and the storing and distribution of the available energy in a manner to carry over periods of inadequate or excessive wind velocity, and provide a substantially uninterrupted supply of power at a substantially constant rate. To accomplish this a very large wind motor is used, mounted for rotation about a vertical axis to convert an extremely large amount of wind energy into mechanical power when the wind velocity is at a usable value, and energy-storing means including weight suspended in deep wells and rendered operative seriatim to descend in the wells and deliver their stored energy at a predetermined rate to a suitable power shaft or generator, the wind motor being operatively coupled with the weights to raise them from the well bottoms and restore their gravitational energy.

Other means of storing energy might be used. For example, in some climates the wind motor might drive pumps to elevate water into a large reservoir so that the hydraulic head of the stored water could be used to operate energy-generating turbines, but such a system has obvious drawbacks for use in cold climates and where sufficient space at the proper elevations is not available.

The invention, therefore, contemplates the use of heavy weights suspended in deep wells or mine shafts as many abandoned wells and shafts are available at no additional expense, and no excessive amount of space is necessary for such an apparatus.

It is, therefore, among the objects of the present invention to provide improved apparatus for converting wind energy into mechanical or electrical power and for delivering such power at a predetermined, constant rate, substantially without interruption, which apparatus converts an extremely large amount of wind energy into mechanical or electrical power, occupies a minimum amount of space, is fully automatic in operation, substantially trouble-free in use, and simple, durable and economical in construction.

Other objects and advantages will become apparent from a consideration of the following description and the appended claims in conjunction with the accompanying drawings, wherein:

Figure 4 is a longitudinal cross-section taken substantially on the line 4—4 of Figure 1;

Figure 13 is a diagrammatic elevation of the clutch-control mechanism illustrated in Figure 11 with the parts in one operative position;

Figure 14 is a view similar to Figure 13 with the parts in a different operative position.

Figure 1:
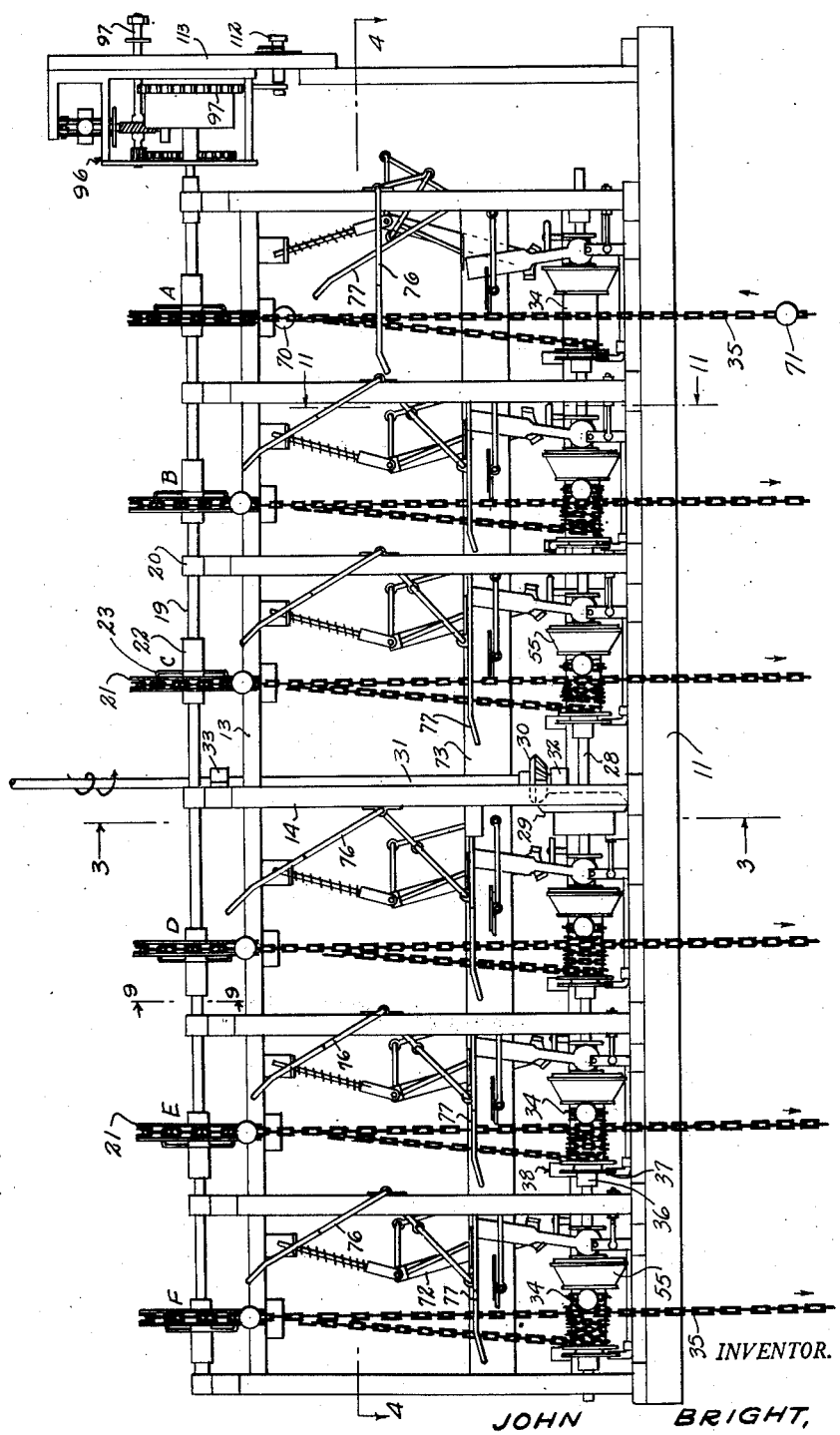
Figure 1 is a front elevation of an apparatus illustrative of the invention, the wind-operated rotor being omitted.

With continued reference to the drawings, numeral 10 generally indicates a frame comprising a pair of longitudinally-extending lower beams 11 and 12 arranged in spaced-apart, parallel relationship with the beam 11 at the front and the beam 12 at the rear of the frame, an upper longitudinal beam 13, and a plurality of spaced-apart, substantially parallel trusses 14 arranged substantially at right angles to the upper and lower beams.

Figure 3:
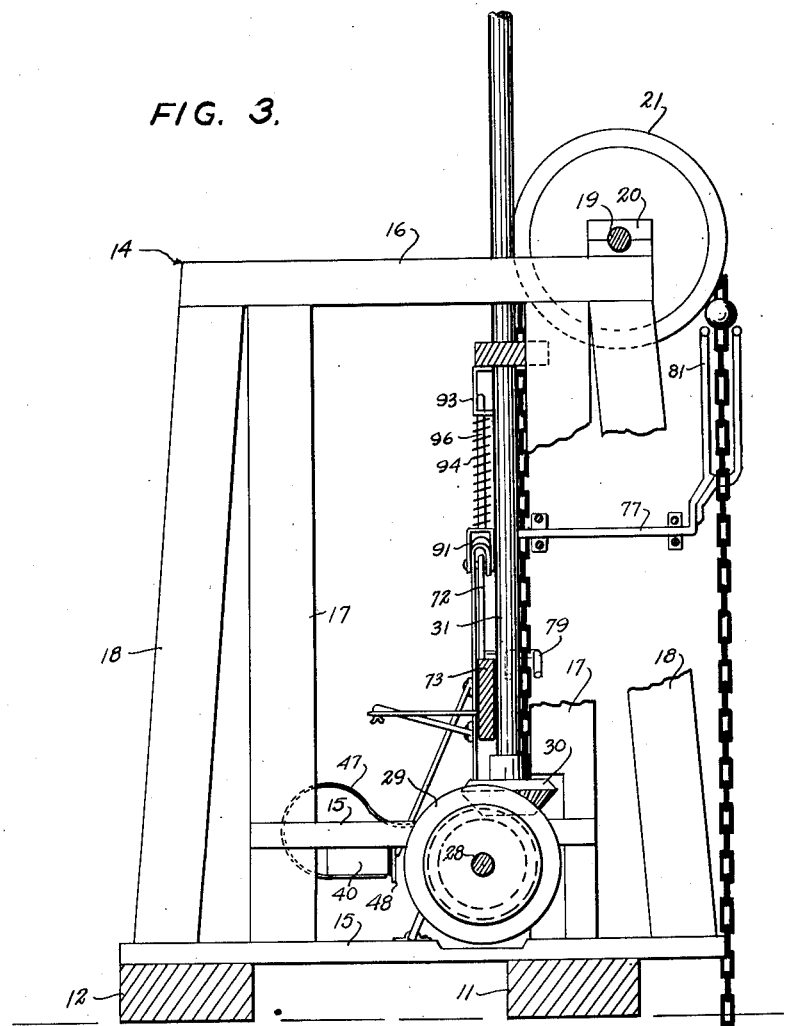
Figure 3 is a transverse cross-section taken substantially in the plane of the section line 3—3 of Figure 1.
Figure 15:
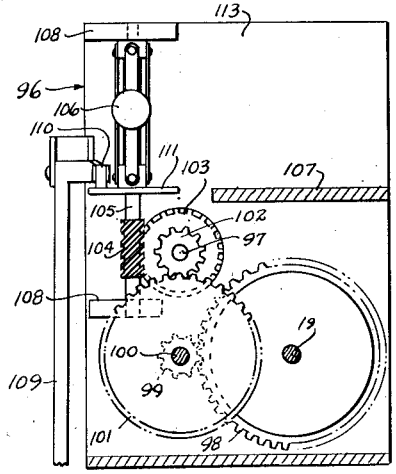
Figure 15 is a vertical cross-section of a governor and reduction-gear unit illustrated in Figures 1 and 2.

Each of the trusses 14, as particularly illustrated in Figure 3, comprises a lower transverse beam 15, an upper transverse beam 16, a pair of vertical posts or standards 17 disposed inwardly of the opposite ends of the upper and lower transverse beams and a pair of downwardly-diverging braces 18 arranged between corresponding opposite ends of the lower and upper transverse beams and outside of the vertical posts 17.

An upper shaft 19 extends longitudinally of the frame above and somewhat forwardly of the upper beam 13 and is journaled in bearing boxes 20 mounted one upon each upper transverse beam 16 at the front end thereof. A plurality of chain pulleys 21 are journaled on shaft 19 and disposed one between each two adjacent trusses 14. A respective sleeve 22 is fixed on shaft 19 adjacent each chain pulley 21 and carries at its end adjacent the corresponding chain pulley a bracket 23 which carries pivotally-mounted pawls 24 and 25 engageable with a ratchet wheel 26 secured to the chain pulley 21 to drivingly connect the chain pulley to shaft 19 for rotation of the shaft in one direction.

A lower shaft 28 extends longitudinally of the frame and is journaled in a plurality of bearing boxes mounted one upon each lower transverse beam 15 at the inner side of the corresponding front vertical post 17. A bevel gear 29 is secured on shaft 28, preferably at substantially the mid-length position thereof and meshes with a bevel gear 30 secured on the lower end of a vertical shaft 31 which extends upwardly above the frame 10 and carries on its upper end a cylindrical vane motor (not illustrated) rotatable about a substantially vertical axis. Shaft 31 is journaled in a lower bearing box 32 and an upper bearing box 33 secured to the adjacent vertical truss 14.

The gears 29 and 30 will rotate shaft 28 whenever shaft 31 is rotated by the wind motor.

A plurality of chain-winding drums 34 are journaled on shaft 28, one between each two adjacent trusses 14 and below each chain pulley 21. A respective chain 35 is wound on each drum 34 and carried over the corresponding chain pulley to depend downwardly in front of the device, a heavy weight being attached to the depending end of each chain.

Figure 5:
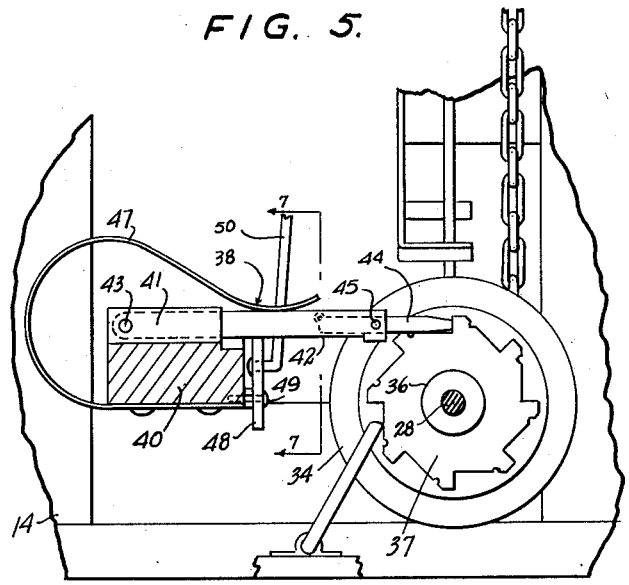
Figure 5 is a transverse cross-section on an enlarged scale of a fragmentary portion of the device, showing a structural detail with the parts illustrated in one operative position.
Figure 7:
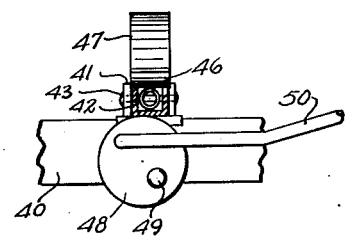
Figure 7 is a transverse cross-section on the line 7—7 of Figure 5.
Figure 6:
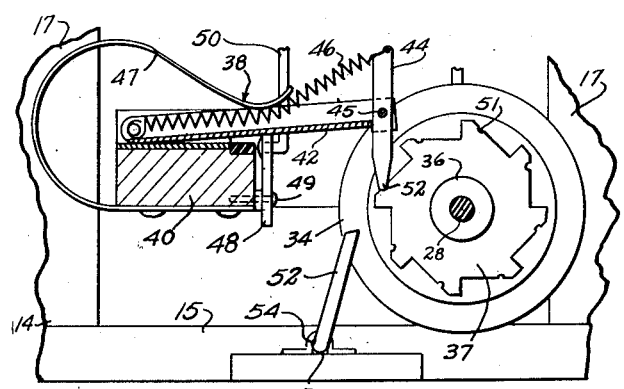
Figure 6 is a view similar to Figure 5, showing the parts in a different operative position.
Figure 8:
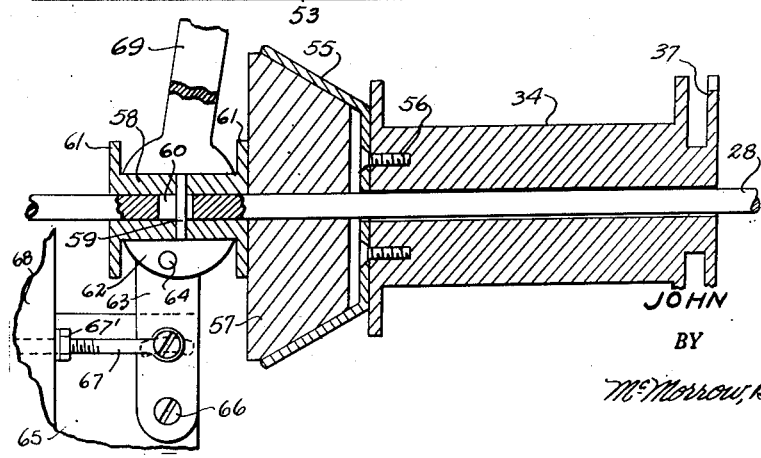
Figure 8 is a transverse cross-section on an enlarged scale of a clutch unit constituting an operative component of the device.
Figure 9:
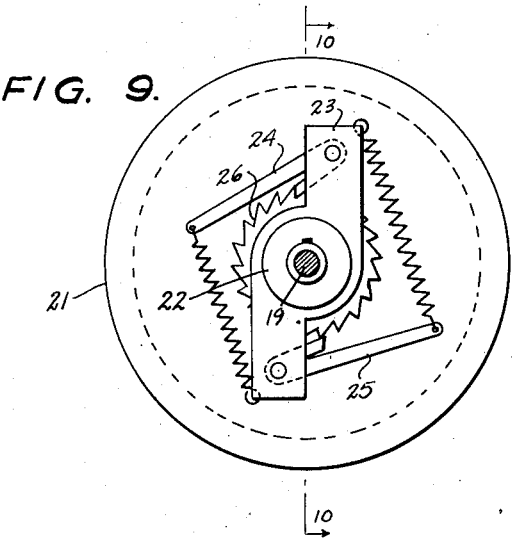
Figure 9 is a transverse cross-section on an enlarged scale of a fragmentary portion of the device, taken substantially on the line 9—9 of Figure 1, and showing a chain pulley and ratchet mechanism associated therewith.
Figure 10:
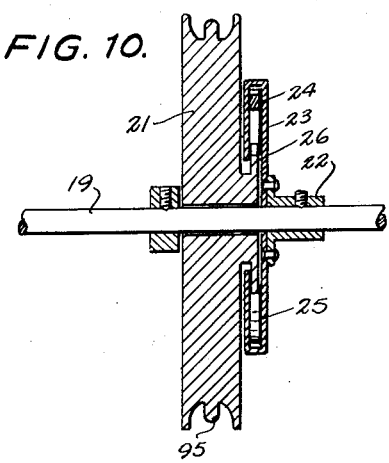
Figure 10 is a transverse cross-section taken substantially on the line 10—10 of Figure 9.

A respective positioning collar 36 is secured on shaft 28 adjacent one end of each winding drum or spool 34 and a ratchet wheel 37 is secured to the corresponding end of each drum. A respective pawl mechanism, generally indicated at 38, and particularly illustrated in Figures 5, 6 and 7, is operatively associated with each ratchet wheel 37. Pawls 38 are all mounted on a longitudinally-extending beam 40 secured to the vertical trusses 14 and each comprises a bracket 41 of channel cross-section secured with its web in contact with the upper surface of the beam and its flanges extending perpendicularly to the beam and transversely thereof, an arm 42 of channel-shaped cross-section having upwardly-directed flanges, received in the bracket 41 and pivotally connected at its rear end to the rear end of the bracket by pivot pin 43, a dog 44 pivotally connected near its mid-length position to the front end of arm 42 by a pivot pin 45 and extending forwardly of the arm 42 to engage the teeth of the ratchet wheel 37 and a tension spring 46 connected between the pivot pin 43 and the rear end of the dog 44.

The arm 42, dog 44, and spring 46 constitute a toggle assembly which is effective to preclude rotation of the ratchet wheel 37 in a counter-clockwise direction, as illustrated in Figure 5, when the dog is in straight alignment with the arm, but which may be broken, as illustrated in Figure 6, to permit rotation of the ratchet wheel and winding drum or spool 34 in the indicated direction. A curved leaf spring 47 is secured at one end to the under-surface of the beam 40, extends upwardly and over the beam and bears at its opposite end on the top of arm 42 near the mid-length location thereof to resiliently maintain the arm and dog in the condition of straight alignment illustrated in Figure 5. The toggle assembly is broken by an eccentric 48 pivotally mounted on the front side of beam 40 by a pivot pin 49 and operated by a link 50, the operation of which will later be described in detail. The teeth of the ratchet wheel 37 are provided in their back or drag sides with depressions or recesses 51 which engage the pointed forward end 52 of the dog 44 to straighten the toggle when the ratchet wheel 37 is rotated in a clockwise direction.

A second pawl 52 is operatively associated with each of the ratchet wheels 37 and may comprise the upwardly-turned end of a rod pivotally secured to the lower transverse beams of the associated trusses by suitable bearing blocks 54. This second pawl 52 is a creeper pawl, the function of which will be later explained in detail.

Each winding spool or drum 34 has a conical clutch element 55 secured to the end thereof opposite the ratchet wheel 37 by suitable means, such as screws or rivets 56. Each conical element 55 is concentric with shaft 28 and receives a respective clutch cone 57 secured to the adjacent end of a tubular clutch collar 58 which is slidable longitudinally of shaft 28, but is restrained against rotation relative to the shaft by suitable means, such as the transverse pin 59 extending through the collar and through an elongated aperture 60 in the shaft.

Collar 58 has an annular flange 61 on each end thereof providing therebetween an annular groove which receives a pair of eccentrics 62 disposed one at each side of the collar for moving the clutch cone 57 relative to the clutch element 55 to engage and disengage the clutch. Eccentrics 62 are pivotally mounted adjacent their lower edges on the upper ends of a pair of parallel supporting levers 63 by pivot pins 64. The levers are pivotally secured at their lower ends to the lower transverse beam 15 of the adjacent truss by an extension 65 secured to the truss beam and a pivot pin or bolt 66 extending through an aperture in each lever near its lower end and into the extension. A link 67 is pivotally connected at one end to each supporting lever 63 above the pivot bolt 66 and has an adjustable connection with the adjacent truss which connection may comprise screw threads on the portion of the link extending through an extension 68 on the truss, and nuts 67' screw threaded onto the link. By adjusting the nuts 67' the eccentrics 62 can be accurately centered relative to the annular groove provided between the end flanges of the collar 58. Eccentrics 62 are connected to the lower ends of the two legs of an upwardly-extending arm 69 having a bifurcated lower end so that movements of the arm move the eccentrics to operate the clutch in a manner presently to be described.

Figure 11:
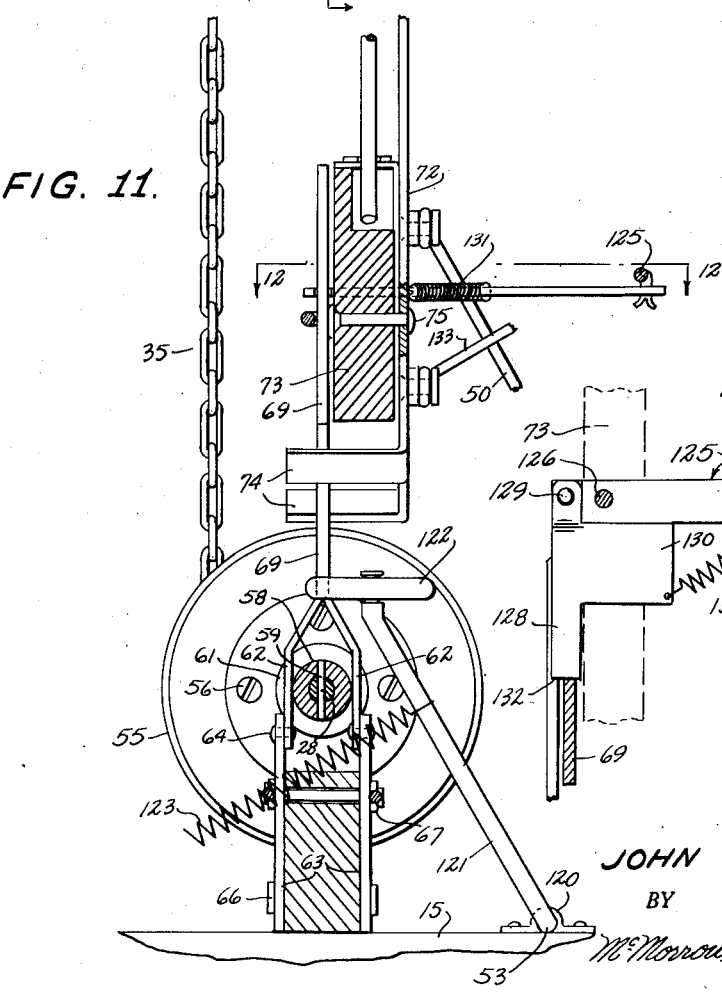
Figure 11 is a transverse cross-section on an enlarged scale of a fragmentary portion of the device taken substantially on the line 11—11 of Figure 1, and showing a clutch-operating mechanism.

Each of the chains 35 has two stop balls secured thereon, one near the end of the chain wound on the corresponding drum 34, as indicated at 70, and one near the lower or weight-attached end of the chain, as indicated at 71. These stop balls are operatively engageable with trip levers for operating the drum clutches as the chains are unwound from the drums and rewound thereon, as illustrated in Figures 11, 13 and 14.

A plurality of clutch-operating levers 72, one for each clutch, are pivotally mounted on a longitudinally-extending beam 73 carried by the trusses 14 and each of these levers is provided at its lower end with a pair of spaced-apart, outwardly-extending tongues 74 which receive a narrow portion of the corresponding arm 69 therebetween. The pivot pins 75 securing each respective lever 72 to the beam 73 is disposed sufficiently above the lower end of the lever, that rocking of the lever about this pivot pin will rock the eccentric arm 69 to engage or disengage the corresponding winding drum clutch depending upon the direction of movement of the lever 72.

As each of the clutch-operating devices is similar in construction and operation, a description of only one is considered sufficient for the purposes of the present disclosure. In each clutch-operating device, two trip levers 76 and 77 are provided. Lever 76 is pivotally connected at one end to the adjacent truss 14 by a suitable bearing clip 78, and is provided at its opposite end with a fork 79 through which the corresponding chain 35 passes when the lever 76 is in its operative or cocked position. Trip lever 77 is pivotally connected at one end to the truss 14 by a suitable bearing clip 80 located above the bearing clip 78, and is also provided at its opposite end with a fork 81 through which the corresponding chain 35 passes when the trip lever 77 is in its operative or cocked position.

In Figure 13 the trip lever 77 is shown in operative or cocked position, while in Figure 14 the trip lever 76 is shown in such operative or cocked position.

A bell crank arm 82 is secured to the pivoted end of arm 76 and extends substantially at right angles to the arm. The distal end of the bell crank arm is provided with an eye 83 connected by a link 84 to the upper end of the clutch-operating lever 72 so that when the forked end of lever 76 is raised the upper end of clutch-operating lever 72 will be swung to the right to the position illustrated in Figure 13 in which position of the clutch-operating lever and arm 69 the associated clutch is disengaged. Thus when the associated chain is fully wound on the corresponding drum 34 and the stop ball near the weighted end of the chain contacts the forked end of lever 81 and raises the lever, the clutch will be disengaged to disconnect the drum from its driving connection with shafts 28 and 31.

Lever 77 has a bell crank arm 85 extending downwardly from its pivoted end substantially at right angles to the trip lever and the distal end of arm 85 is provided with an eye 86 connected by a link 87 to an eye 88 on trip lever 76 intermediate the length of the latter, the arrangement being such that when trip lever 76 is raised by the stop ball near the weighted end of the chain, trip lever 77 will be brought to its operative or cocked position, as illustrated in Figure 13. While the forked end of lever 76 receives the chain at the outer or front side of the corresponding sheave 21, the forked end of the trip lever 77 receives the chain at the inner or rear side of the sheave, and as the chain is unwound from the associated drum the stop ball near the drum-connected end of the chain will engage the forked end of lever 77 to raise this lever. Raising of lever 77 swings the upper end of clutch-operating arm 72 to the left, as viewed in Figures 13 and 14, to the position illustrated in Figure 14, to re-engage the associated clutch and condition the mechanism for rewinding the associated chain by rotation of shafts 31 and 28.

Clutch-operating lever 72 is releasably held in either of its operative positions, as illustrated in Figures 13 and 14, by a toggle mechanism including a guide rod 90 having on one end a bifurcated clip 91 secured to the upper end of lever 72 by a pivot pin 92 and slidable at its upper end through an aperture in a fixed bracket 93 and a coiled compression spring 94 surrounding the guide rod between bracket 93 and clip 91 to resiliently hold the lever 72 in either of its limiting angular positions corresponding to engagement and disengagement of the associated clutch.

Each of the sheaves 21 is provided with a peripheral chain-receiving groove and with teeth or other formations 95 in the groove to engage the links of the corresponding chain 35 so that the sheave will be rotated whenever the corresponding clutch is released and the weighted end of the chain descends. Rotation of the sheave 21 upon descent of the weighted end of the associated chain will be transmitted to shaft 19 through the ratchet wheel 26 and pawls 24 and 25. However, when the clutch is engaged and the corresponding winding drum is rotated to rewind the chain and raise the weighted end thereof, the incident rotation of sheave 21 in this particular direction is not transmitted to shaft 19, since in this case the pawls 24 and 25 will ratchet over the teeth of the ratchet wheel 26.

When the descending weighted end of one of the chains 35 rotates the shaft 19 through the associated sheave 21 and ratchet mechanism, this rotation of shaft 19 is transmitted through a speed-increasing-gear-train and governor mechanism, generally indicated at 96, to the drive shaft 97 to which the driving mechanism, such as a water pump, mill or electric generator, is operatively connected. The speed-increasing-gear train, as illustrated, comprises a large gear 98 secured on shaft 19 and meshing with a small gear 99 fixed on a jack shaft 100, and a large gear 101 also fixed on the jack shaft at a location spaced from small gear 99 and meshing with a small gear 102 on drive shaft 97. A worm gear 103 secured on the drive shaft meshes with a worm 104 formed on a shaft 105, the upper end of which is drivingly connected to a conventional friction type, centrifugal governor 106. The gear train is mounted in a suitable housing 107 and the governor shaft 105 is journaled at its upper and lower ends in bearing blocks 108 secured to the housing. The speed as regulated by the governor 106 is controlled by movement of a lever 109 pivotally connected at its upper end to the housing 107 and provided with an outwardly-extending arm which carries the governor friction brake 110 which contacts the upper surface of the flat governor disc 111. The lower end of control lever 109 is connected to a regulating pin 112 extending through the front wall 113 of the housing 107 and preferably threaded through this wall so that rotation of the pin will adjustably move the lower end of the regulating lever 109.

While a particular form of gear train, governor and governor-regulating means has been shown to illustrate an operative structure, it is to be understood that various types of transmissions, governors, and regulators may be used without in any way exceeding the scope of the invention.

In order to insure the operation of the mechanism over a long period of substantial calm, a plurality of chain units are provided, six such units being included in the illustrated form of the invention. In order to insure the proper operation of the device it is necessary that these units should be operative seriatim to rotate the shaft 19 and that the chains should be rewound in the same manner in order not to stall the wind motor by placing the load of two or more weighted chains on it at the same time.

Assuming that all of the chains are fully wound on the respective drums 34, that the shaft 31 is rotating, and that the weighted end of one of the chains is descending, all of the clutches will be disengaged so that the shaft 28 may rotate freely under the power delivered to it through the shaft 31. Under these conditions all of the levers 76 will be up, releasing the several clutches and the corresponding trip levers 77 will be down or in cocked position.

Now, when the descending chain is fully unwound, the ball stop on its drum-attached end will contact the corresponding trip lever 77 raising this lever to engage the corresponding clutch, whereupon the shaft 28 will rotate the drum to rewind the chain. When the lever 77 moves up it automatically trips another selected one of the chain units so that the weighted end of this other chain can start to descend, continuing the rotation of shaft 19.

Figure 2:
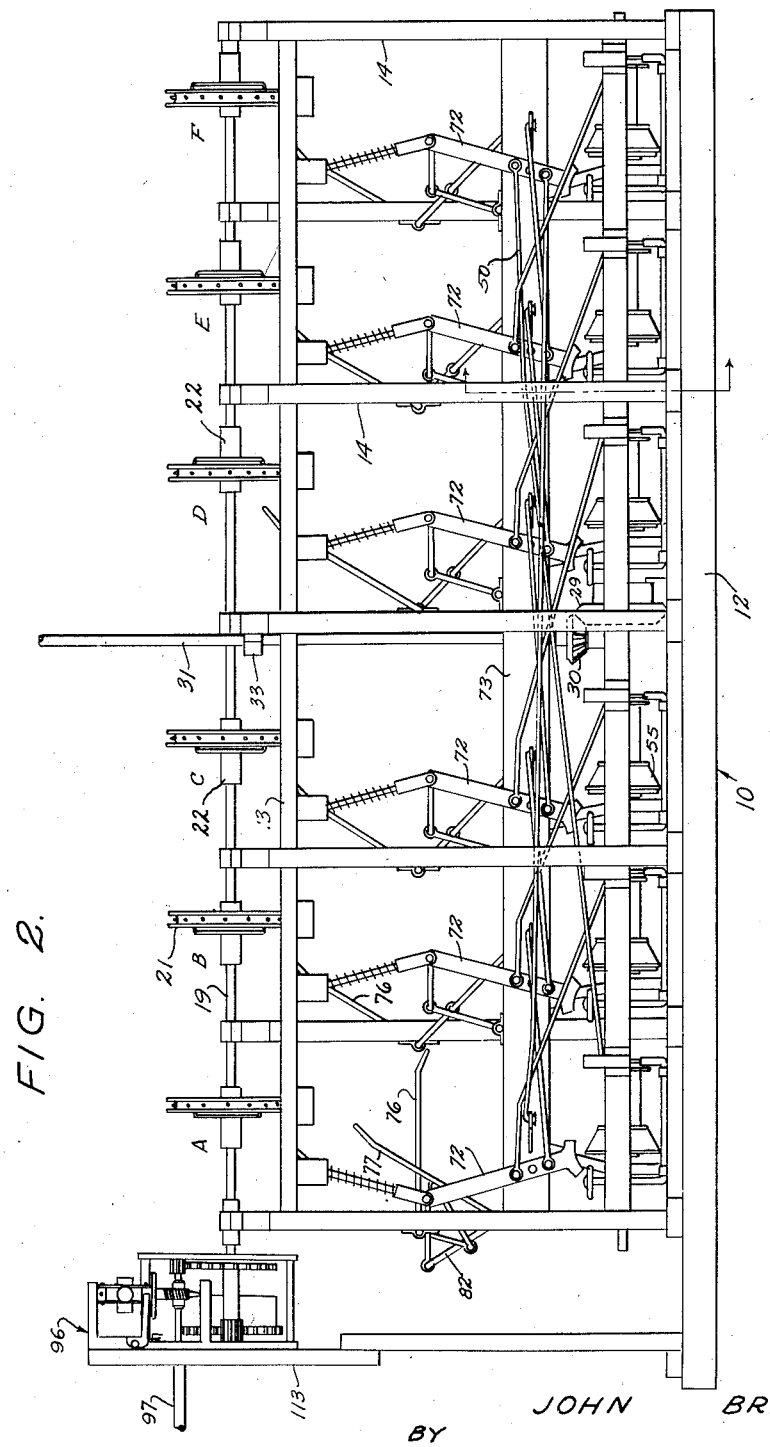
Figure 2 is a rear elevation of the apparatus illustrated in Figure 1.

While the chains are wound and the clutches released, the drums are held against rotation by the respective toggle pawl devices 38 and if one of these toggle pawls is broken, as illustrated in Figure 6, the associated chain will immediately begin to unwind. Now, designating the several chain units as A, B, C, D, E, and F, reading from right to left in Figure 1, and left to right in Figure 2, it will be noted that the link 50 connects the toggle-breaking eccentric 48 of the unit B with the clutch-operating lever 72 of the unit A, so that when this clutch lever is thrown to engage the clutch of the unit A, the toggle pawl of the unit B will be broken, permitting the chain 35 of the unit B to unwind. Similar links 115, 116, 117 and 118 connect the respective clutch-operating levers 72 of the successive units B, C, D, E and F with the toggle-breaking eccentrics of the next succeeding units C, D, E and F. A long link 119 connects the clutch-operating lever 72 of the last unit F back to the toggle-breaking eccentric of the first unit A to complete the cyclic operation of the device. Thus, if all of the chains are fully wound to begin with, and one of the toggle pawls is broken, permitting the corresponding chain to descend, the remaining toggle pawls will be broken in succession as the succeeding chains descend and become fully unwound so that all of the chains will descend in a predetermined order.

The toggle pawls 38 normally take care of the re-winding of the chains, preventing loss of any re-winding gain until the chain is fully rewound and the pawl broken by the complete unwinding of the connected unit. There is one condition, however, under which the secondary pawls 52 are needed. If, during a prolonged period of calm weather all of the chains should become completely unwound, all of the clutch-operating levers 72 would be thrown toward clutch-engaging position which would mean that all of the toggle pawls would be broken and remain so until one of the chains was re-wound. If now, with all of the chains completely unwound, there are sporadic winds or gusts which tend to rotate the wind motor periodically, one of the chains will be re-wound, depending upon which respective clutch is fully engaged and the secondary pawls 52 will be operative to prevent loss of re-winding effort when the wind dies down between gusts. As stated above, the pawl 52 is the upturned end of a shaft 53 which is pivotally mounted in suitable bearing clips 120 secured to the lower transverse beams 15 of the adjacent vertical trusses. The end of the rod 15 opposite the pawl 52 is also upturned to provide an arm 121 extending substantially at right angles to the rod and a small wheel or roller 122 is rotatably mounted on the upper end of arm 121 in position to be engaged by the corresponding eccentric arm 69. The secondary pawl 52 is resiliently urged out of engagement with the ratchet wheel 37 by a tension spring 123 operatively connected between the arm 121 and the frame, and the pawl is held out of engagement with the ratchet wheel at all times during which the associated clutch is disengaged. When the eccentric arm 69, however, is moved in a clutch-engaging direction, the roller 122 rides up on this arm pushing the pawl 52 into engagement with the ratchet wheel. Thus, with all of the chains unwound, and all of the toggle pawls consequently broken, one of the chains can be re-wound through the operation of the secondary or creeper pawl 52. As soon as one of the chains has been re-wound, it will trip the toggle pawl of the connected unit so that from that point on, re-winding of the chains will proceed in the usual manner, the re-winding gains being held by the associated toggle pawls.

There is a secondary or creeper pawl for each winding drum as it is not possible to determine which chain will be first re-wound after all of the chains have been fully unwound.

Figure 12:
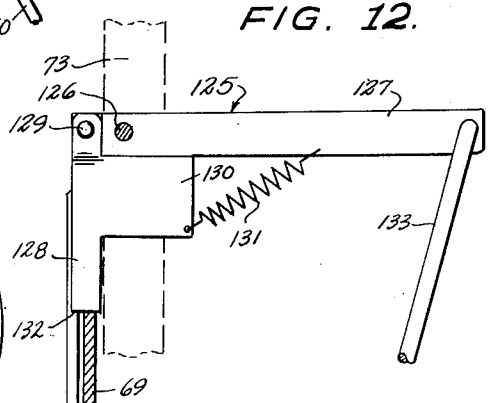
Figure 12 is a plan view of a clutch-controlling stop, the view being partly in section on line 12—12 of Figure 11.

When all of the chains are down, as explained above, all of the clutch-operating levers will be moved toward clutch-engaging position. It is necessary, however, that only one clutch at a time be engaged for re-winding of the associated chain, as an operative engagement of all of the clutches or even of two or more at one time would tend to stall the wind motor and render the device inoperative. A sequential engagement of the clutches under these conditions is obtained by the provision of respective stop or trigger units, one for each chain unit, as particularly illustrated in Figure 12.

Each trigger 125 is disposed in a respective longitudinally-elongated opening provided in the longitudinal beam 73 and pivotally connected to the beam by a pivot pin 126 secured in the beam and extending through an aperture in the bell crank lever adjacent the angle thereof. The short arm 128 is pivotally connected to the long arm 127 by pivot pin 129 extending through the two arms at the angle of the lever to provide a limited pivotal movement between the two arms. A rectangular extension 130 on the short arm 128 bears along one edge against the adjacent edge of the long arm 127 to support the arms in a position in which they are substantially at right angles to each other and a tension spring 131 connected between this bracket and the long arm resiliently maintains the arms in this perpendicular relationship. The short arm 128 has a straight front edge 132 engageable with the adjacent edge of the corresponding eccentric arm 69 to limit the clutch-engaging movement of this arm so that the clutch cannot be engaged until the distal end 132 is moved out of the path of the arm 69.

A link 133 is connected to the distal end of the long arm 127 so that tension on this link will move the distal end of the short arm out of the path of the eccentric arm 69. The opposite end of link 133 is connected to the clutch-actuating arm 72 of the same unit which is connected to the particular unit under consideration by one of the arms 50, 115, 116, 117, 118 or 119. In Figure 4 the link 133 is shown at the right-hand end of the figure and the links corresponding thereto are indicated at 134, 135, 136, 137 and 138.

When the chains are all fully wound so that the corresponding trip levers 77 are down or in their cocked position, and all of the clutches have been released, all of the clutch arm stops will be open. The first chain to completely unwind will trip its associated trip lever 77 and swing the corresponding clutch-operating lever over to clutch-engaging position while the clutch lever stop is still open, thus the clutch of the first chain unit to unwind will be engaged. Movement of the clutch-operating lever of the first unit, however, closes the clutch-lever stop of the next connected unit and this is carried out in succession so that none of the other clutches can fully engage until the first chain to unwind has been completely re-wound. Thus, if all of the chains should become unwound at the same time they would be re-wound one at a time, starting with the first chain that was unwound.

Since the first clutch stop was open when the corresponding clutch eccentric arm moved to clutch-engaging position, this arm will pass between the short arm of the clutch-lever stop and the adjacent surface of the beam 73. When the chain of the connected unit unwinds, tripping of its trip lever will move its eccentric arm and clutch-operating lever which will attempt to move the stop of the first unit to closed position. Under these conditions the spring 131 of the first unit clutch stop permits the indicated movement of the long arm of the bell crank stop lever, although the short arm of this lever is held against movement by engaging the outer face of the associated eccentric arm.

With a steady or continuous wind, each chain will be re-wound immediately after it has unwound, while the next connected unit is unwinding so that in this case there is no danger of imposing a load of more than one chain and suspended weight on the wind motor at one time.

By using large units, including heavy anchor chains descending into very deep wells, such as oil wells, and heavy weights, for example, 50-ton weights, on the ends of these chains, a large amount of power can be developed even though the weights descend very slowly. It is contemplated, for example, that it would take twenty-four hours for one chain to completely unwind. Thus, the device, if started in a substantially fully wound condition, would operate for at least five days of calm or insufficient wind. As the wind is very seldom absent or below the minimum necessary velocity for a period of five consecutive days, the device should deliver a steady flow of power at all times without interruption. While a very large wind motor unit would be needed to re-wind the chains, even one at a time, this can be easily accomplished by mounting a large unit on a vertical shaft with wind-operated vanes of extremely large area. The wind motor would not have to rotate at any excessive speed as it would not be necessary to re-wind the chains at a rate of speed much greater than the rate at which they unwind. For example, twelve hours might be allowed for re-winding each of the chains of the multiple unit.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for converting energy into mechanical power comprising a wind driven shaft, a power output shaft, a plurality of strands each having a depending portion, an individual weight secured to the depending end of each strand, a strand supporting shaft, a plurality of sheaves journaled on said supporting shaft, one for each strand, operatively engaging said strands for rotation by the passing of the respective strands thereover, a one-way driving connection between each sheave and said supporting shaft so arranged that said sheaves rotate said supporting shaft as the weighted ends of the corresponding strands descend, means including a speed increasing gear train and a speed governor drivingly connecting said strand supporting shaft to said power output shaft, respective winding means connected to the ends of said strands opposite the weighted ends thereof, to rewind said strands and raise said weights, means operative to hold said winding means with said strands rewound thereon, means operatively inter-connected between said strands and said winding means to release said holding means seriatim for descent of the weighted ends of said strands, means drivingly connecting said wind driven shaft with said winding means for rewinding of said strands seriatim by said wind driven shaft, and means supporting said shafts and said connecting means in operative assembly.

2. Apparatus for converting wind energy into mechanical power comprising a frame, a wind driven shaft, a power output shaft, a strand supporting shaft, and a strand rewinding shaft all journaled on said frame means drivingly connecting said wind driven shaft to said rewinding shaft, means drivingly connecting said strand supporting shaft to said power output shaft, a plurality of weighted strand units each including a winding drum journaled on said rewinding shaft, a clutch operatively interposed between said drum and said rewinding shaft, ratchet means interposed between said drum and said frame to releasably restrain said drum against rotation in an unwinding direction, a sheave on said strand supporting shaft, a strand connected at one end to said drum and suspended over said sheave, a weight on the opposite end of said strand, a one-way driving connection between said sheave and said strand supporting shaft operative to rotate said shaft upon unwinding of said strand, a pair of stop balls on said strand, a pair of trip levers on said frame operated respectively by said stop balls to engage said clutch when said strand is unwound and disengage said clutch when said strand is rewound, means operated by the trip lever of each unit to release the ratchet means of a succeeding unit when the strand of the first unit is unwound, and means operated by the trip lever of each unit to engage the clutch of a succeeding unit when the strand of the first unit is rewound.

3. Apparatus for converting wind energy into mechanical power comprising a frame, a wind driven shaft, a power output shaft, a strand supporting shaft, and a strand rewinding shaft all journaled on said frame, means drivingly connecting said wind driven shaft to said rewinding shaft, means drivingly connecting said strand supporting shaft to said power output shaft, a plurality of weighted strand units each including a winding drum journaled on said rewinding shaft, a clutch operatively interposed between said drum and said rewinding shaft, ratchet means interposed between said drum and said frame to releasably restrain said drug against rotation in an unwinding direction, a sheave on said strand supporting shaft, a strand connected at one end to said drum and suspended over said sheave, a weight on the opposite end of said strand, a one-way driving connection between said sheave and said strand supporting shaft operative to rotate said shaft upon unwinding of said strand, a pair of stop balls on said strand, a pair of trip levers on said frame operated respectively by said stop balls to engage said clutch when said strand is unwound and disengage said clutch when said strand is rewound, means operated by the trip lever of each unit to release the ratchet means of a succeeding unit when the strand of the first unit is unwound, and means operated by the trip lever of each unit to engage the clutch of a succeeding unit when the strand of the first unit is rewound, said last-mentioned means including toggle levers operated by said trip arms to condition said clutches for engagement, and clutch stops delaying engagement of the clutch of each unit until the strand of the preceding unit has been rewound and its clutch released whereby only one rewinding drum is operatively connected to said rewinding shaft at any time.

JOHN BRIGHT.

REFERENCES CITED

The following references are of record in the file of this patent:

UNITED STATES PATENTS

| Number | Name | Date |
| --- | --- | --- |
| 45,530 | Smith | Dec. 20, 1864 |
| 148,311 | Lockwood | Mar. 10, 1874 |
| 705,700 | Osterud | July 29, 1902 |
| 972,981 | Anderson | Oct. 18, 1910 |
| 985,674 | Homishak | Feb. 28, 1911 |
| 997,663 | Ford | July 11, 1911 |
| 1,225,685 | Skandora | May 8, 1917 |
| 1,311,203 | Artz | July 29, 1919 |